US012800736B2

(12) United States Patent
Hong

(10) Patent No.: US 12,800,736 B2
(45) Date of Patent: Nov. 17, 2026

(54) SYSTEM AND METHOD OF CALIBRATING CAMERA AND LIDAR SENSOR THROUH HIGH-RESOLUTION CONVERSION OF LiDAR DATA

(71) Applicant: INDUSTRY FOUNDATION OF CHONNAM NATIONAL UNIVERSITY, Gwangju (KR)

(72) Inventor: Sung-Hoon Hong, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 835 days.

(21) Appl. No.: 18/167,796

(22) Filed: Feb. 10, 2023

(65) Prior Publication Data

US 2024/0069176 A1 Feb. 29, 2024

(30) Foreign Application Priority Data

Aug. 25, 2022 (KR) ........................ 10-2022-0107082

(51) Int. Cl.
*G01S 7/497* (2006.01)
*G01S 17/86* (2020.01)
(Continued)

(52) U.S. Cl.
CPC .............. *G01S 7/497* (2013.01); *G01S 17/86* (2020.01)

(58) Field of Classification Search
CPC ........ G01S 7/497; G01S 17/86; G01S 7/4972; G01S 17/89; G06T 3/4053; G06T 5/50; G06T 7/13; G06T 7/80
See application file for complete search history.

(56) References Cited

U.S. PATENT DOCUMENTS 10,841,496 B2 * 11/2020 Wheeler ................. G01S 17/87
11,131,753 B2 * 9/2021 Banerjee .................. H04N 5/04
(Continued)

FOREIGN PATENT DOCUMENTS

KR 10-2011-0006360 A 1/2011
KR 10-2020-0082109 A 7/2020
KR 10-2309608 B1 10/2021

OTHER PUBLICATIONS

Grammatikopoulos, Lazaros, et al. "An effective camera-to-LiDAR spatiotemporal calibration based on a simple calibration target." Sensors 22.15 (2022): 5576. (Year: 2022).*
(Continued)

*Primary Examiner* — Gregory A Morse
*Assistant Examiner* — Ronde Lee Miller
(74) *Attorney, Agent, or Firm* — You & IP, LLC

(57) ABSTRACT

A system and method of calibrating a camera and a LiDAR sensor through high-resolution conversion of LiDAR data is proposed. The system is included a data reception unit for receiving at least one image data and LiDAR data, which are obtained by photographing a target object, from the respective camera and LiDAR sensor, a feature point extraction unit for extracting feature points of each of the received image data and LiDAR data, a conversion information derivation unit for deriving image conversion information for fusing the feature points of each image data, and deriving LiDAR conversion information for fusing the feature points of each LiDAR data, and a data fusing unit for fusing at least two feature points of the image data, and fusing at least two feature points of the LiDAR data, thereby fusing the fused feature points of the image data and LiDAR data.

6 Claims, 5 Drawing Sheets

(51) Int. Cl.

| | |
|---|---|
| ***G01S 17/89*** | (2020.01) |
| ***G06T 3/4053*** | (2024.01) |
| ***G06T 5/50*** | (2006.01) |
| ***G06T 7/13*** | (2017.01) |
| ***G06T 7/80*** | (2017.01) |

(56) References Cited

U.S. PATENT DOCUMENTS

| | | | | |
|---|---|---|---|---|
| 11,249,174 | B1 * | 2/2022 | Zhang | G01S 7/497 |
| 11,721,043 | B2 * | 8/2023 | Haeusler | B60R 11/04 348/148 |
| 12,072,420 | B2 * | 8/2024 | Hey | G06V 20/17 |
| 12,322,139 | B2 * | 6/2025 | Petrov | G06T 7/90 |
| 2021/0254989 | A1 | 8/2021 | Lee et al. | |
| 2021/0287035 | A1 * | 9/2021 | Deegan | G06V 10/82 |
| 2022/0055652 | A1 * | 2/2022 | Lee | G01S 17/89 |
| 2024/0371035 | A1 * | 11/2024 | Jadhav | G01S 17/86 |

OTHER PUBLICATIONS

Office Action from the Korean Patent Office in a counterpart application.

* cited by examiner

SYSTEM AND METHOD OF CALIBRATING CAMERA AND LIDAR SENSOR THROUH HIGH-RESOLUTION CONVERSION OF LiDAR DATA

CROSS REFERENCE TO RELATED APPLICATION

The present application claims priority to Korean Patent Application No. 10-2022-0107082, filed Aug. 25, 2022, the entire contents of which is incorporated herein for all purposes by this reference.

BACKGROUND OF THE INVENTION

Field of the Invention

The present disclosure relates to a method of calibrating a camera and a LiDAR sensor through high-resolution conversion of LiDAR data and, more particularly, to a technology that enables calibration between a camera and a LiDAR with feature points for each image frame photographed by the camera and LiDAR.

Description of the Related Art

Recently, application industries using data fusion technology of various multi-sensors such as cameras, LiDARs, thermal imaging, and radars are increasing. In particular, commercialization of heterogeneous sensor fusion systems such as intelligent three-dimensional (3D) surveillance systems and autonomous driving of mobility and robots is becoming possible by fusing information of the cameras and LiDARs.

For example, since a visible light RGB camera provides two-dimensional (2D) positions and color information, and a LiDAR provides distance information, an object may be visualized in three dimensions by mapping the information of the camera and the LiDAR. To this end, three-dimensional calibration that accurately matches relative positions between the camera and the LiDAR should be performed first.

The camera has merits of wide angle of view, high resolution, and low price, but does not provide distance information. LiDAR, on the other hand, is in high demand due to application of forward object detection technology in autonomous driving mobility and safety detection systems, but high price, narrow angle of view, and high power consumption act as obstacles to the expansion of LiDAR sensor application markets. When 3D visualization may be realized by using a low-resolution LiDAR, the problems of cost and power consumption of the LiDAR may be solved.

Most of the studies related to calibration between a camera and a LiDAR use a method of finding camera-LiDAR matching parameters by mapping 3D points of the LiDAR to a two-dimensional image of the camera. That is, the camera and the LiDAR are used to photograph the same marker board, and the matching parameters, which map feature points detected from LiDAR data onto feature points detected by the camera, are estimated.

The feature points refer to coordinate values such as vertices and corners of a marker board. The marker board 130 is installed to be visible from a camera sensor 110 and a LiDAR sensor 120, which are internally calibrated, and then 2D image information of the marker board and 3D surface information of an object is simultaneously obtained. 2D feature points of the object are extracted on the basis of the 2D image information obtained from the camera, and then 3D feature points corresponding to the 2D feature points are detected on the basis of 3D distance information obtained from the LiDAR sensor.

However, when the two sensors detect dissimilar feature points or when a corresponding relation between the feature points respectively obtained from the camera and the LiDAR is wrong, an error occurs in a calibration result. In addition, when a low-cost low-resolution LiDAR sensor is used, there is a problem that precise calibration is difficult to perform because accurate feature points are unable to be detected due to lack of 3D information of the marker board.

DOCUMENTS OF RELATED ART

Patent Documents (Patent Document 1) Korean Patent No. 10-2309608 (Oct. 6, 2021)

SUMMARY OF THE INVENTION

The present disclosure may provide a system and method of calibrating a camera and a LiDAR sensor through high-resolution conversion of LiDAR data, the system and method accurately deriving feature points of the LiDAR data measured from the low-resolution LiDAR sensor to calibrate data of the camera and the LiDAR sensor.

According to one aspect of the present disclosure, there is provided a system of calibrating a camera and a LiDAR sensor through high-resolution conversion of LiDAR data, the system including: a data reception unit for receiving each of at least one image data obtained by photographing a target object by the camera and at least LiDAR data obtained by sensing distance and direction information on the target object by the LiDAR sensor; a feature point extraction unit for extracting feature points of each of the received image data and LiDAR data; a conversion information derivation unit for deriving image conversion information for fusing the feature points of each image data with the extracted feature points of the image data, and deriving LiDAR conversion information for fusing the feature points of each LiDAR data with the feature points of the image data and the derived image conversion information; and a data fusing unit for fusing at least two or more feature points of the image data with the derived image conversion information, and fusing at least two or more feature points of the LiDAR data with the derived LiDAR conversion information, to fuse the fused feature points of the image data and the fused feature points of the LiDAR data.

Preferably, any one of the image data and the LiDAR data may be identified by projecting the target object onto a marker board.

Preferably, the image conversion information may be a conversion matrix between each image data, and the LiDAR conversion information may a conversion matrix between each LiDAR data.

Preferably, the feature point extraction unit may derive a plurality of edge information of which the edges are boundaries of the marker board, and connect the plurality of derived edge information with straight lines, thereby deriving intersection points at which the edge information and the straight lines intersect.

Preferably, the feature point extraction unit may extract feature points from the fused LiDAR data.

Preferably, the conversion information extraction unit may derive rotation information and translation information of any one of the image data and the LiDAR data in a three-dimensional space.

According to another aspect of the present disclosure, there is provided a method of calibrating a camera and a LiDAR sensor through high-resolution conversion of LiDAR data, the method including: receiving each of at least one image data obtained by photographing a target object through a marker board by the camera and at least one LiDAR data obtained by sensing distance and direction information on the target object by the LiDAR sensor; extracting the feature points of each of the received image data and LiDAR data; deriving image conversion information for fusing at least two or more feature points of the image data and LiDAR conversion information for fusing at least two or more feature points of the LiDAR data with the feature points of the image data and the derived image conversion information; and fusing the at least two or more feature points of the image data with the derived image conversion information and the at least two or more feature points of the LiDAR data with the derived LiDAR conversion information, to fuse the fused feature points of the image data and the fused feature points of the LiDAR data.

According to the present disclosure, a recognition rate of the feature points of the low-resolution LiDAR data may be improved, and accuracy of the calibration between the camera and the LiDAR may be improved.

DETAILED DESCRIPTION OF THE INVENTION

Figure 1:
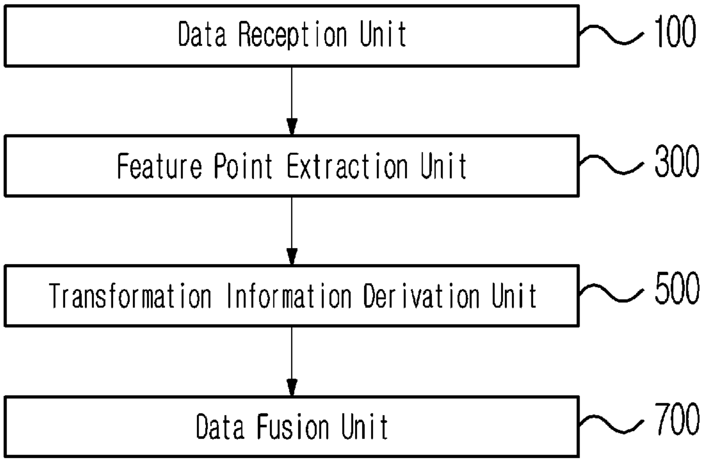
FIG. 1 is a configuration diagram illustrating a system of calibrating a camera and a LiDAR sensor according to an exemplary embodiment.

Hereinafter, a system and method of calibrating a camera and a LiDAR sensor through high-resolution conversion of LiDAR data according to the present disclosure will be described in detail with reference to the accompanying drawings. In this process, the thickness of the lines or the size of components shown in the drawings may be exaggerated for clarity and convenience of description. In addition, terms to be described later are terms defined in consideration of functions in the present disclosure and may vary according to the intentions or practices of the operators. Therefore, definitions of these terms should be made based on the content throughout the present specification.

Objectives and effects of the present disclosure may be naturally understood or more clearly understood by the following description, and the objectives and effects of the present disclosure are not limited only by the following description. In addition, in describing the present disclosure, when it is determined that a detailed description of a known technology related to the present disclosure may unnecessarily obscure the subject matter of the present disclosure, the detailed description thereof will be omitted.

FIG. 1 is a configuration diagram illustrating a system of calibrating a camera and a LiDAR sensor according to an exemplary embodiment.

As shown in FIG. 1, the high-resolution conversion system of calibrating the camera 10 and the LiDAR sensor 20 according to the exemplary embodiment includes a data reception unit 100, a feature point extraction unit 300, a conversion information derivation unit 500, and a data fusion unit 700.

The data reception unit 100 receives each data, including: at least one image data obtained by photographing a target object by the camera 10; and at least one LiDAR data obtained by sensing distance and direction information of the target object by the LiDAR sensor 20.

The feature point extraction unit 300 extracts feature points of each of the received image data and LiDAR data.

Here, the feature point extraction unit 300 may derive a plurality of edge information of which the edge is a boundary of a marker board 30, and connect the plurality of derived edge information with straight lines, thereby deriving intersection points at which the edge information and the straight lines intersect.

The conversion information derivation unit 500 derives image conversion information for fusing feature points of each image data with feature points of the extracted image data, and derives LiDAR conversion information for fusing feature points of each LiDAR data with the feature points of the image data and the derived image conversion information.

The conversion information derivation unit 500 may derive rotation information and translation information of any one of the image data and the LiDAR data in a three-dimensional space.

The data fusion unit 700 fuses the at least two or more feature points of the image data with the derived image conversion information, and fuses the at least two or more feature points of the LiDAR data with the derived LiDAR conversion information, thereby fusing the fused feature points of the image data and the fused feature points of the LiDAR data.

Here, the image data may be image frames of which the target object is photographed through the marker board 30, and the LiDAR data may be LiDAR frames of which the target object is recognized through the marker board 30.

In addition, the image conversion information may be the conversion information between each image data, and the LiDAR conversion information may be the conversion information between each LiDAR data.

The feature point extraction unit 300 may extract feature points from the fused LiDAR data. In this case, the feature points of the already extracted LiDAR data and the feature points of the fused LiDAR data may be compared to each other, and the low-resolution LiDAR data may be converted into high-resolution LiDAR data with the feature points of the fused LiDAR data.

The LiDAR data may be point cloud data.

The above-described system of calibrating the camera 10 and LiDAR sensor 20 through the high-resolution conversion may include a data reception unit 100, a feature point extraction unit 300, a conversion information derivation unit 500, and a data fusion unit 700.

That is, a server receives the photographed image data from the camera 10 and receives the sensed LiDAR data from the LiDAR sensor 20, to derive the feature points of each of the received image data and LiDAR data, thereby fusing the derived feature points, but may convert the low-resolution LiDAR data into high-resolution LiDAR data in order to extract accurate feature points of the image data and LiDAR data. In this case, image conversion information for fusing the feature points of each image data may be derived, and there may be provided a process of deriving LiDAR conversion information for converting the low-resolution LiDAR data into the high-resolution LiDAR data with the feature points of the image data and the image conversion information.

Here, sensors capable of performing calibration through high resolution conversion is not limited to the camera 10 and the LiDAR sensor 20, and may further include a laser sensor, a thermal image sensor, and a radar sensor. Low-resolution data may be converted into high-resolution data by using high-resolution data from any one of the sensors.

Figure 2:
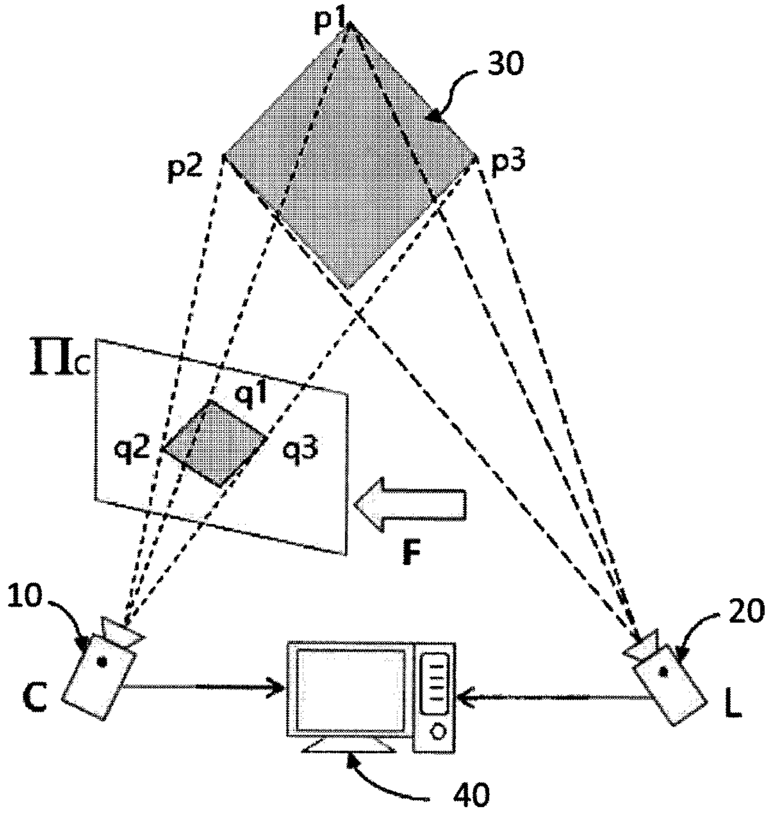
FIG. 2 is an exemplary view illustrating the system of calibrating the camera and the LiDAR sensor according to the exemplary embodiment.

FIG. 2 is an exemplary view illustrating the system of calibrating the camera and the LiDAR sensor according to the exemplary embodiment.

As shown in FIG. 2, in the calibration of the camera 10 and LiDAR sensor 20, theoretically, when there are just three corresponding points, a three-dimensional conversion relationship between two sensors may be obtained.

When three feature points in a three-dimensional space are respectively expressed as p1, p2, and p3, and three feature points on a two-dimensional projection plane Πc of the camera 10 are respectively expressed as q1, q2, and q3, the feature points pi on the two-dimensional plane of the camera 10 and the feature points qi in the three-dimensional space may be expressed by the following equation using a conversion matrix F representing a three-dimensional geometric conversion relationship.

$$q_k=I_cFp_k=I_cR(p_k-T) \quad \text{[Equation 1]}$$

In Equation 1, $q_k$ is three-dimensional coordinates of each point obtained by a LiDAR, and $p_k$ is two-dimensional image plane coordinates corresponding to $q_k$. In addition, $I_c$ is an intrinsic matrix composed of intrinsic parameters representing intrinsic characteristics of the camera 10, and the conversion matrix F is composed of a three-dimensional rotation matrix R and a three-dimensional translation vector T.

When there are three or more mutually corresponding feature points obtained from two sensors, the conversion matrix F may be obtained by using the following equation to maximally reduce an error ε of the following equation.

$$\varepsilon=\Sigma_k\|q_k-I_cFp_k\|=\Sigma_k\|q_k-I_cR(p_k-T)\| \quad \text{[Equation 2]}$$

In this case, in order to extract feature points of image data and feature points of LiDAR data, a marker board 30 having shape information thereof accurately measured in advance may be used.

Calibration for each image data and each image frame, which are received from the camera 10, may be performed, and an object in the three-dimensional space may be projected onto the two-dimensional image plane Πc of the camera 10. In this case, coordinates P on the three-dimensional space may be transformed into coordinates $P_c$ on the image plane by image conversion information $F_c$ representing the three-dimensional geometric conversion relationship, and may be expressed by the following equation.

$$P_c=I_cF_cP=I_c[R_c|T_c]P=I_cR_c(P-T_c) \quad \text{[Equation 3]}$$

In Equation 3, an intrinsic matrix 4 is composed of intrinsic parameters representing the intrinsic characteristics of the camera 10, and an extrinsic matrix $[R_c|T_c]$ may be composed of a rotation matrix $R_c$ including information on three rotation angles and a translation vector $T_c$ including information on three translation distances in the three-dimensional space.

Here, the intrinsic matrix $I_c$ of the camera 10 may be expressed by the following equation.

$$I_c=\begin{bmatrix} f_x & s & c_x \\ 0 & f_x & c_y \\ 0 & 0 & 1 \end{bmatrix}=\begin{bmatrix} 1 & 0 & c_x \\ 0 & 1 & c_y \\ 0 & 0 & 1 \end{bmatrix}\times\begin{bmatrix} f_x & 0 & 0 \\ 0 & f_y & 0 \\ 0 & 0 & 1 \end{bmatrix}\times\begin{bmatrix} 1 & s/f_x & 0 \\ 0 & 1 & 0 \\ 0 & 0 & 1 \end{bmatrix} \quad \text{[Equation 4]}$$

In Equation 4, $c_x$ and $c_y$ express a center of an image, $f_x$ and $f_y$ express a focal length of a pixel, and s is a shear coefficient. The intrinsic characteristics of the camera 10 may be estimated and corrected by using the intrinsic matrix $I_c$. The intrinsic matrix $I_c$ of the camera 10 may be decomposed into a product of a 2D translation matrix, a 2D scaling matrix, and a 2D shear matrix.

After respective positions of the camera 10 and the LiDAR sensor 20 are fixed, 2D image data of the camera 10 and 3D data of LiDAR may be obtained simultaneously while moving a marker board 30 at a position where the internally calibrated camera 10 and LiDAR sensor 20 are able to photograph the marker board 30 at the same time.

After the intrinsic matrix of the camera 10 is derived, feature points of the marker board 30 may be extracted from an image frame of the camera 10 photographing the moving marker board 30. In this case, the coordinates $P_c(n)$ of the n-th image data may be derived from the coordinates P(n) in the three-dimensional space, and may be expressed by the following equation.

$$P_c(n)=I_cF_c(n)P(n)=I_c[R_c(n)|T_c(n)]P(n) \quad \text{[Equation 5]}$$

In Equation 5, $F_c(n)$ is an extrinsic matrix derived from feature points of the n-th image data among at least one image frame, and $R_c(n)$ and $T_c(n)$ are respectively a three-dimensional rotation matrix and a translation vector, which constitute the extrinsic matrix $F_c(n)$ of the n-th image data among the at least one image frame.

In addition, image conversion information, which accurately fuses the feature points of the m-th image data with the feature points of the n-th image data, may be derived. In a case of a high-resolution camera 10, since feature points of the marker board 30 may be accurately derived, image conversion information $F_c(n, m)$ that satisfies the following equation may be derived.

$$P_c(n)=F_c(n,m)P_c(m) \quad \text{[Equation 6]}$$

In this case, by substituting Equation 5 into Equation 6, a conversion relationship between the n-th LiDAR data and the m-th LiDAR data, which are obtained from the LiDAR data may be derived by the following equation.

$$P(n)=H(n,m)P(m)=\left[F_c^{-1}(n)F_c(n,m)F_c(m)\right]P(m) \quad \text{[Equation 7]}$$

In Equation 7, H(n, m) is a conversion matrix between LiDAR frames, mapping the n-th LiDAR data to the m-th LiDAR data, and instead of using inaccurate LiDAR data, high-resolution LiDAR data may be derived by using the image data of the high-resolution camera 10.

That is, by using image conversion information that is a conversion matrix between two image data and using an extrinsic matrix for the feature points of each image data derived from the n-th image data and the m-th image data, which are obtained from the high-resolution camera 10, LiDAR conversion information that is a conversion matrix between the n-th data and the m-th LiDAR data may be derived and, low-resolution LiDAR data may be converted into high-resolution LiDAR data by [Equation 7].

Accurate feature points for the marker board 30 may be extracted from the LiDAR data fused with high resolution, and the conversion matrix F that maximally reduces the error ε of [Equation 2] is calculated, whereby accurate calibration between the high-resolution camera 10 and the low-resolution LiDAR may be performed. In this case, the conversion matrix F has a predetermined value with respect to a frame when relative positions of the camera 10 and the LiDAR are constant.

Figure 3A:
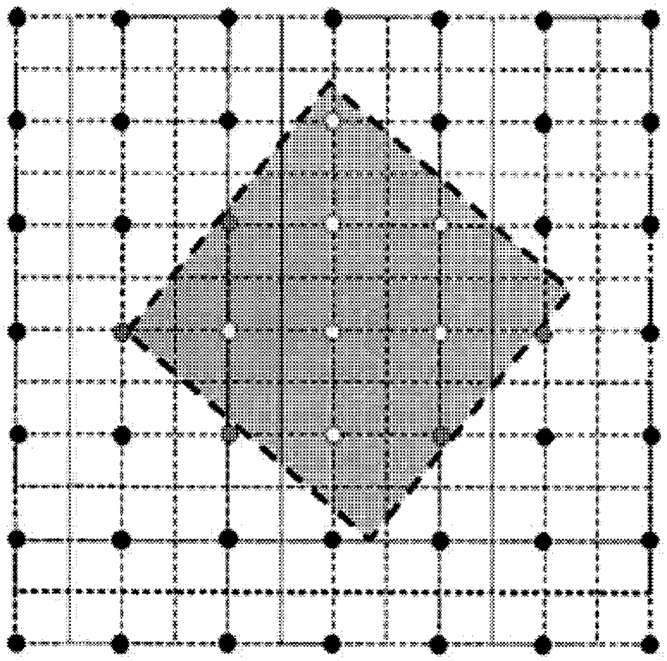
FIGS. 3A to 3C are exemplary views illustrating a fusion process of LiDAR data according to the exemplary embodiment.
Figure 3B:
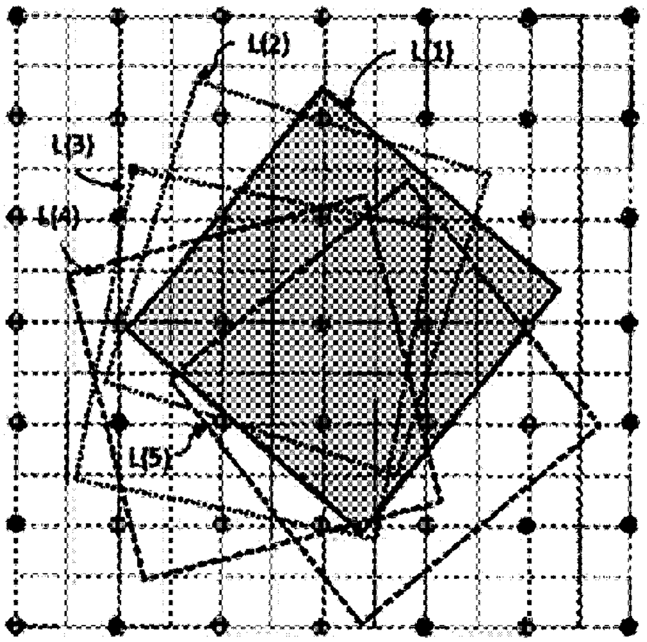
Figure 3C:
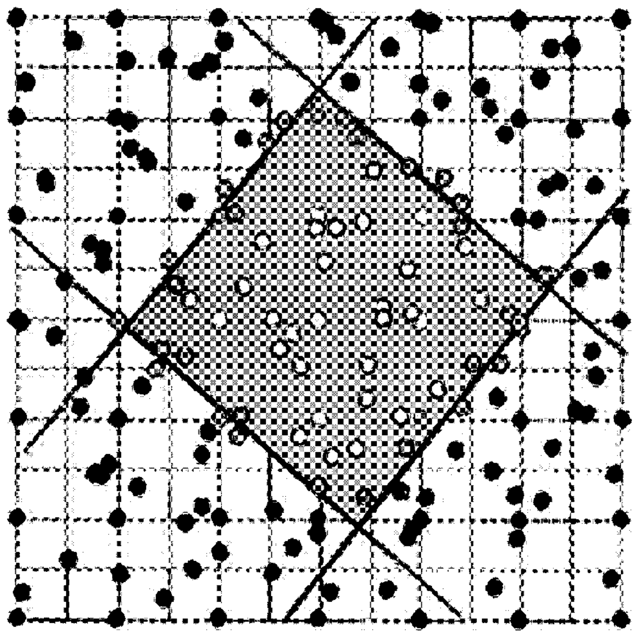

FIGS. 3A to 3C are exemplary views illustrating a fusion process of LiDAR data according to the exemplary embodiment.

As shown in FIGS. 3A to 3C, FIG. 3A is a view illustrating LiDAR data obtained by photographing a marker board 30 with a low-resolution LiDAR sensor 20, FIG. 3B is a view illustrating five of LiDAR data L1 to L5 obtained by sensing the moving marker board 30, and FIG. 3C is a view illustrating a result of fusing each LiDAR data.

In FIG. 3A, each LiDAR data may represent coordinates of the marker board 30, and may display coordinates within the marker board 30, coordinates outside the marker board 30, and coordinates of a boundary part, which are displayed in respective colors of white, black, or gray. However, the displayed color is for describing the exemplary embodiment, and is not limited thereto.

In order to obtain vertices as feature points of the marker board 30, edges corresponding to boundaries of the marker board 30 are derived and straight lines corresponding to the respective boundaries are connected to each other by using a Hough Transform or Random Sample Consensus (RANSAC) algorithm, so that points at which the straight lines intersect may be derived as the respective feature points of the marker board 30. However, in the case of low-resolution LiDAR data, it is difficult to accurately derive coordinates of the vertices due to insufficient data.

In FIG. 3B, each of four of LiDAR data may be fused through the conversion of [Equation 7], and as shown in FIG. 3C, in the fused LiDAR data, the number of points increases significantly.

Here, on the basis of LiDAR data L1 among the LiDAR data, LiDAR data L2 to L5 may be fused to the LiDAR data L1, and the camera 10 and the LiDAR sensor 20 may be calibrated by way of deriving feature points from the fused LiDAR data and fusing the feature points of the image data and the feature points of the LiDAR data.

Figure 4:
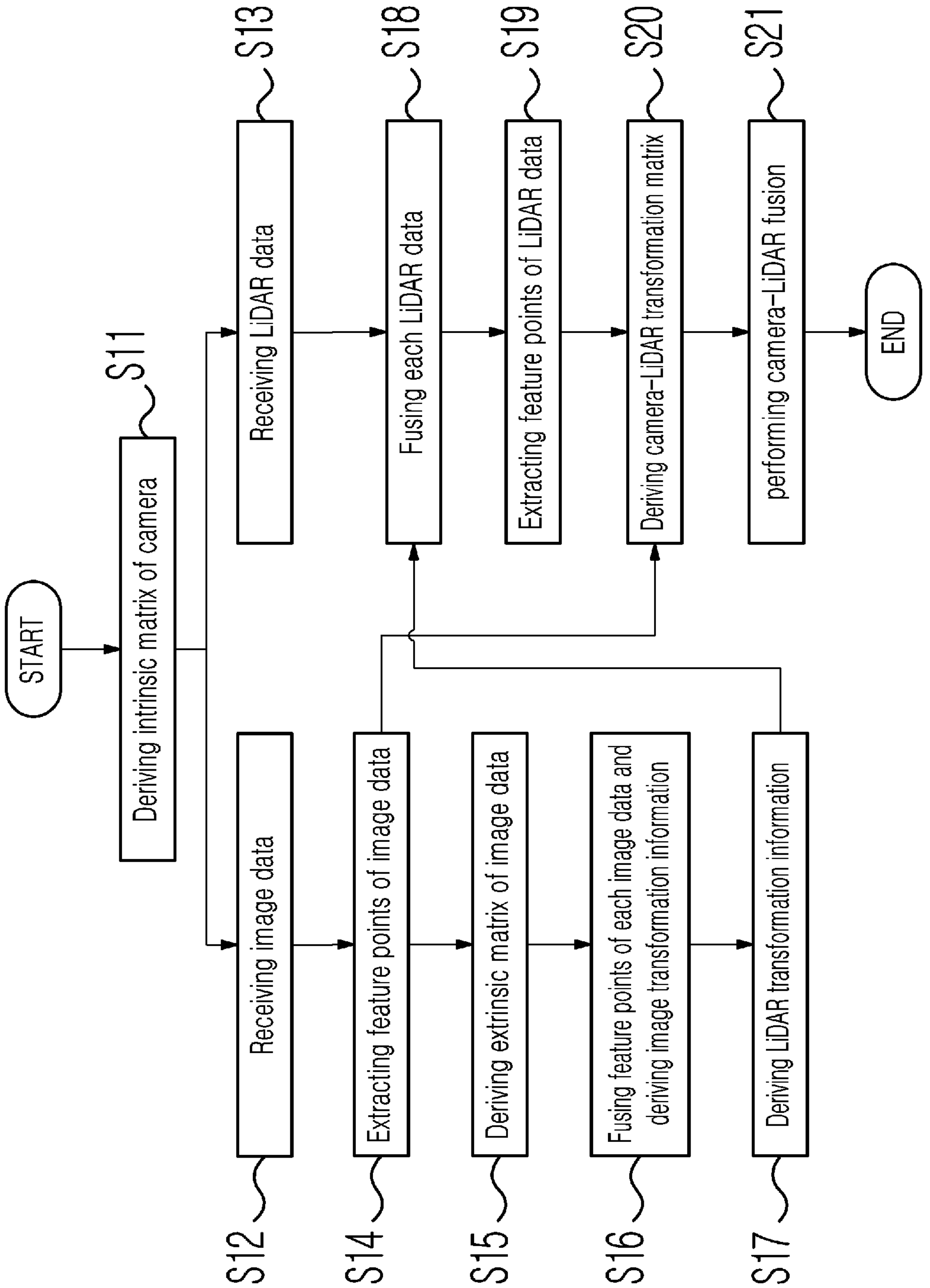
FIG. 4 is a block diagram illustrating a calibration algorithm for image data and the LiDAR data according to the exemplary embodiment.

FIG. 4 is a block diagram illustrating a calibration algorithm for image data and LiDAR data according to the exemplary embodiment.

As shown in FIG. 4, the calibration algorithm according to the exemplary embodiment may include: steps S12 and S13 of respectively receiving image data and LiDAR data; and step S14 of extracting feature points from the received image data; and step S15 of deriving an extrinsic matrix for each feature point of the extracted image data. Here, there may be provided steps, including: step S16 of deriving image conversion information, which is a conversion matrix for fusing at least two or more feature points of the image data, and step S17 of deriving LiDAR conversion information, which is a conversion matrix for fusing each LiDAR data with the derived extrinsic matrix and image conversion information. Further, there may be provided steps, including: step S18 of fusing each LiDAR data with the derived LiDAR conversion information; step S19 of deriving feature points of the fused LiDAR data; step S20 of deriving fusion conversion information for fusing the feature points of the image data and the feature points of the fused LiDAR data; and step S21 of fusing the image data and the LiDAR data with the fusion conversion information.

Figure 5:
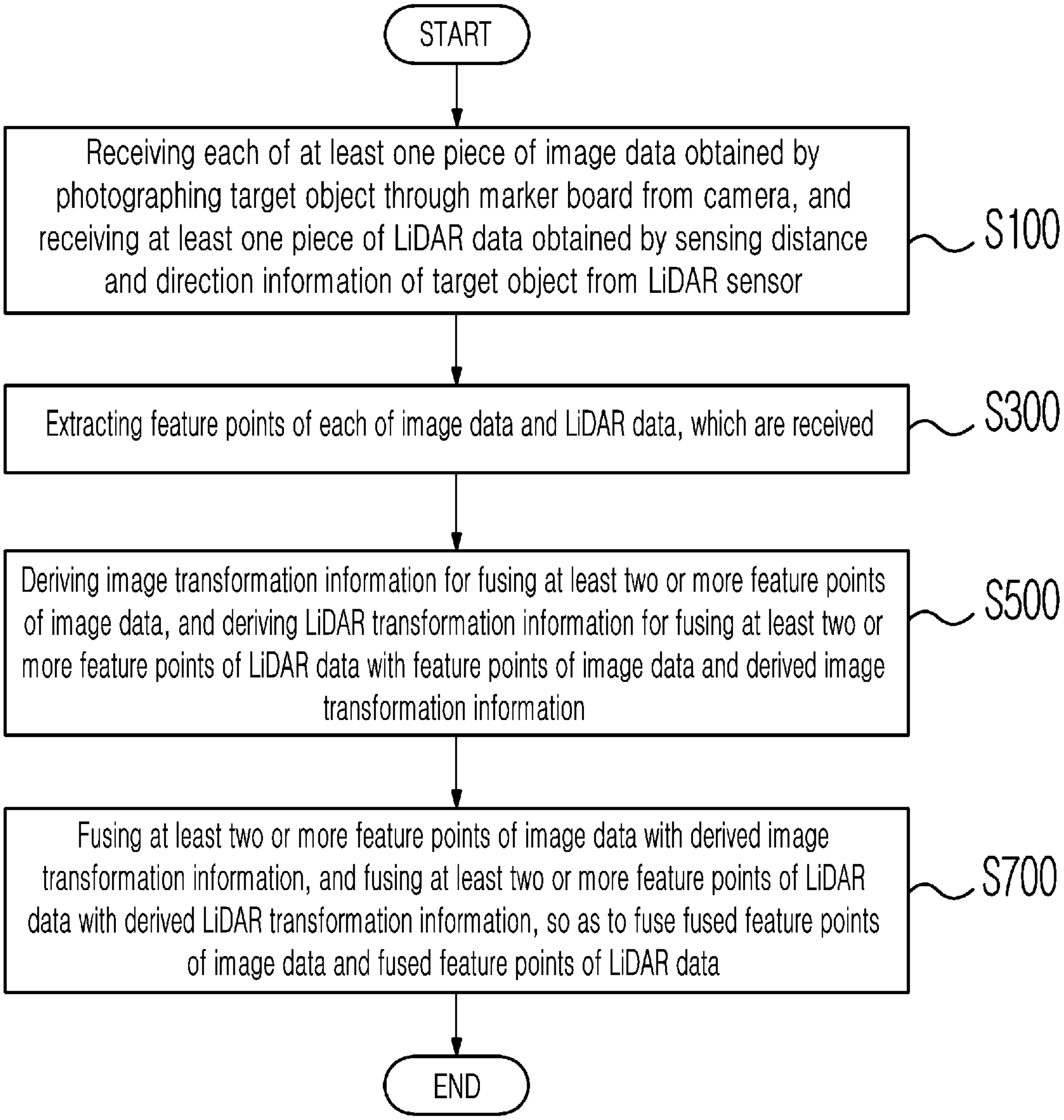
FIG. 5 is a flowchart illustrating a method of calibrating a camera and a LiDAR sensor according to the exemplary embodiment.

FIG. 5 is a flowchart illustrating the method of calibrating the camera and the LiDAR sensor according to the exemplary embodiment.

In FIG. 5, the method of calibrating the camera 10 and the LiDAR sensor 20 through high-resolution conversion according to the exemplary embodiment includes: step S100 of receiving data; step S300 of extracting feature points; step S500 of deriving conversion information; and step S700 of fusing the data.

In step S100 of receiving of the data, each of at least one image data obtained by photographing a target object through a marker board 30 by a camera 10 and at least one LiDAR data obtained by sensing distance and direction information of the target object by a LiDAR sensor 20 is received.

In step S300 of extracting the feature points, feature points of each of the received image data and LiDAR data may be extracted.

In step S500 of deriving the conversion information, image conversion information for fusing at least two or more feature points of the image data may be derived, and the LiDAR conversion information for fusing at least two or more feature points of the LiDAR data may be derived with the feature points of the image data and the derived image conversion information.

In step S700 of fusing the data, the at least two or more feature points of image data may be fused with the derived image conversion information, and the at least two or more feature points of LiDAR data may be fused with the derived LiDAR conversion information, thereby fusing the fused feature points of the image data and the fused feature points of the LiDAR data.

Although the present disclosure has been described in detail through the exemplary embodiments above, those skilled in the art to which the present disclosure pertains will understand that various modifications can be made to the above-described exemplary embodiments without departing from the scope of the present disclosure. Therefore, the scope of the present disclosure should not be limited to the described exemplary embodiments, and should be determined not only by the scope of the claims to be described later, but also by any changes or modifications derived from the scope and equivalents of the claims.

What is claimed is:

1. A system of calibrating a camera and a light detection and ranging (LiDAR) sensor through high-resolution conversion of LiDAR data, the system comprising:
- a server;
- a camera; and
- a LIDAR sensor,
- wherein the server is configured to:
- receive at least one image data obtained by photographing a target object by the camera, and at least one LiDAR data obtained by sensing distance and direction information on the target object by the LiDAR sensor;
- extract feature points of the received image data;
- derive an extrinsic matrix for each feature point of the extracted image data;
- derive image conversion information for fusing at least two or more feature points of the image data;

derive LiDAR conversion information, for fusing at least two or more feature points of the LiDAR data, using the derived extrinsic matrix and the derived image conversion information;

fuse each LiDAR data with the derived LiDAR conversion information, thereby increasing resolution of the LiDAR data;

derive feature points of the fused LiDAR data;

derive fusion conversion information for fusing the feature points of the image data and the feature points of the fused LiDAR data; and fuse the at least two or more feature points of the image data with the derived image conversion information, and fusing the at least two or more feature points of the LIDAR data with the derived LiDAR conversion information, and to fuse the fused feature points of the image data and the fused feature points of the LiDAR data, wherein the server is configured to convert the LiDAR data of low-resolution into the LiDAR data of high-resolution by using the image date obtained by the camera of high-resolution, and to calibrate the camera and the LiDAR sensor using the LiDAR data of high-resolution.

2. The system of claim 1, wherein any one of the image data and the LIDAR data is identified by projecting the target object onto a marker board.

3. The system of claim 1, wherein the image conversion information is a conversion matrix between each image data, and the LiDAR conversion information is a conversion matrix between each LiDAR data.

4. The system of claim 2, wherein the server derives a plurality of edge information of which the edges are boundaries of the marker board, and connects the plurality of derived edge information with straight lines, thereby deriving intersection points at which the edge information and the straight lines intersect.

5. The system of claim 1, wherein the server derives rotation information and translation information of any one of the image data and the LiDAR data in a three-dimensional space.

6. A method of calibrating a camera and a light detection and ranging (LiDAR) sensor through high-resolution conversion of LiDAR data, the method comprising:

receiving at least one image data obtained by photographing a target object through a marker board by the camera, and at least one LiDAR data obtained by sensing distance and direction information on the target object by the LiDAR sensor;

extracting feature points of the received image data;

deriving an extrinsic matrix for each feature point of the extracted image data;

deriving image conversion information for fusing at least two or more feature points of the image data;

deriving LiDAR conversion information, for fusing at least two or more feature points of the LiDAR data, using the derived extrinsic matrix and the derived image conversion information;

fusing each LiDAR data with the derived LiDAR conversion information, thereby increasing resolution of the LiDAR data;

deriving feature points of the fused LiDAR data;

deriving fusion conversion information for fusing the feature points of the image data and the feature points of the fused LiDAR data; and fusing the at least two or more feature points of the image data with the derived image conversion information and the at least two or more feature points of the LiDAR data with the derived LiDAR conversion information, and to fuse the fused feature points of the image data and the fused feature points of the LiDAR data, wherein the method is configured to convert the LiDAR data of low-resolution into the LiDAR data of high-resolution by using the image date obtained by the camera of high-resolution, and to calibrate the camera and the LiDAR sensor using the LiDAR data of high-resolution.

* * * * *